(12) United States Patent
Xu et al.

(10) Patent No.: US 10,926,366 B2
(45) Date of Patent: Feb. 23, 2021

(54) TWO DEGREE-OF-FREEDOM NANO MOTION CONTROL AND POSITIONING STAGE WITH PARALLEL FLEXURE HINGE MECHANISM

(71) Applicants: GUANGDONG UNIVERSITY OF TECHNOLOGY, Guangzhou (CN); SANYING MOTIONCONTORL(TIANJIN) INSTRUMENT CO., LTD., Tianjin (CN)

(72) Inventors: Ying Xu, Guangzhou (CN); Jing Jia, Tianjin (CN); Huifeng Wang, Tianjin (CN)

( * ) Notice: Subject to any disclaimer, the term of this patent is extended or adjusted under 35 U.S.C. 154(b) by 11 days.

(21) Appl. No.: 16/402,863

(22) Filed: May 3, 2019

(65) Prior Publication Data

US 2020/0206859 A1   Jul. 2, 2020

(51) Int. Cl.
| | | |
|---|---|---|
| B23Q 1/34 | (2006.01) | |
| B23Q 16/00 | (2006.01) | |
| B01L 9/00 | (2006.01) | |
| F16C 11/04 | (2006.01) | |
| G12B 5/00 | (2006.01) | |

(52) U.S. Cl.
CPC ............... *B23Q 16/00* (2013.01); *B01L 9/52* (2013.01); *B23Q 1/34* (2013.01); *F16C 11/04* (2013.01); *G12B 5/00* (2013.01); *B01L 2200/18* (2013.01)

(58) Field of Classification Search
CPC .......... B23Q 1/62; B23Q 1/621; B23Q 1/626; B23Q 1/34; B23Q 1/36; G02B 21/26; G02B 26/00; Y10T 74/20348; B82Y 35/00; G12B 5/00; H02N 2/028

USPC .................................................... 74/490.1
See application file for complete search history.

(56) References Cited

U.S. PATENT DOCUMENTS

| | | | |
|---|---|---|---|
| 6,346,710 B1 * | 2/2002 | Ue | G12B 5/00 250/311 |
| 7,093,827 B2 | 8/2006 | Culpepper | |
| 8,495,761 B2 * | 7/2013 | Shibuya | H02N 2/028 850/8 |
| 2007/0094756 A1 | 4/2007 | Snider et al. | |
| 2018/0010376 A1 | 1/2018 | Beattie | |

FOREIGN PATENT DOCUMENTS

| | | |
|---|---|---|
| CN | 107081760 A | 8/2017 |
| CN | 107833594 A | 3/2018 |

* cited by examiner

*Primary Examiner* — Jeremy R Severson
(74) *Attorney, Agent, or Firm* — Erson IP (Nelson IP)

(57) ABSTRACT

A two degree-of-freedom nano positioning stage with a parallel flexure hinge mechanism includes two driving systems respectively arranged along an X axis and a Y axis, a moving stage, a parallel flexure hinge mechanism and a base frame, wherein each of the driving systems includes a piezo actuator, a connecting block, a lever, a preloading spring, a push rod and a plurality of connecting hinges; the piezo actuator is fixed on the base frame at one end and connected with the connecting block at the other end; the lever is connected between the connecting block and the preloading spring, the connecting block is connected with the lever through one of the connecting hinges; the preloading spring is fixed on the base frame at one end and connected with the lever at the other end, and the lever is connected with the base frame through another one of the connecting hinges.

9 Claims, 7 Drawing Sheets

TWO DEGREE-OF-FREEDOM NANO MOTION CONTROL AND POSITIONING STAGE WITH PARALLEL FLEXURE HINGE MECHANISM

CROSS-REFERENCE TO RELATED APPLICATIONS

This application claims priority to Chinese Patent Application No. 201811430442.4 with a filing date of Dec. 27, 2018. The content of the aforementioned applications, including any intervening amendments thereto, are incorporated herein by reference.

TECHNICAL FIELD

The disclosure relates to the technical field of nano motion control and particularly to a two degree-of-freedom nano positioning stage (NPS) with a parallel flexure hinge mechanism.

BACKGROUND OF THE DISCLOSURE

One of core technologies to be solved firstly by measurement and analysis of nano-micro structures and nano-materials or manipulation, modification and processing of nano-materials such as DNA molecules, carbon nanotubes and nanoparticles is nano-motion control technology. It refers to the technology of displacement measurement and motion control at nanometer level or even atomic level with nano level of precision and stability. The development of advanced semiconductor chip manufacturing technologies and large-scale memory (hard disk) manufacturing technologies continuously pushes the nano-motion control technology to new limits. With the continuous improvement of device integration level, processing precision requirements of many devices have approached the nanometer or even sub-nanometer level, and traditional detection techniques and means are facing great challenges. The precision measurement and inspection technology has been considered as one of bottleneck technologies that must be overcome in next-generation semiconductor chip manufacturing technologies and large-scale memory (hard disk) manufacturing technologies. In addition, the precision and the stability of ultra-precision machining tools depend on the technical level of nano precision feed systems. Therefore, nano motion and positioning control systems have become key technologies and core components common to various ultra-precision measurement, processing and detection instruments.

A structural design of an XY nano positioning stage is generally divided into two categories: a series structure and a parallel structure. The series structure is to superimpose two single-axis stages together, movement directions of which are at an angle of 90 degrees to each other. Advantages of such a structure are simple in structure design and no movement crosstalk between two axes; however, since the lower stage is to carry the upper stage, dynamic characteristics of each axis will be greatly different, resulting in lower working bandwidth of lower stage. The parallel structure is designed with a composite structure to decouple the movements in X and Y directions within a flexure linkage mechanism, thereby achieving separated movements in the X axis and the Y axis, and eliminating the crosstalk between the movements in the X axis and the Y axis. The moving stages in the X direction and the Y direction are the same moving stage, which is characterized by compact structure, high integrity, good consistency in static and dynamic characteristics of individual axis, compact size and easy installation.

In the prior art, one technical solution of the parallel structure is as described in the disclosure CN 201210518329.8, but such a structure is large in area of the hinges, not compact in layout, and small in area of the moving stage, which is not suitable for the case where an aperture at the center of the moving stage is necessary for certain applications.

SUMMARY OF DISCLOSURE

In view of deficiencies in the prior art, the disclosure provides a two degree-of-freedom nano positioning stage with a parallel flexure hinge mechanism to solve problems that the above-mentioned stage is complicated in structure, large in area of hinge mechanism, and small in area of moving stage.

To achieve the above objective, the disclosure adopts the following technical solution.

There is provided a two degree-of-freedom nano positioning stage with a parallel flexure hinge mechanism, including two driving systems respectively arranged along an X axis and a Y axis, a moving stage, a parallel flexure hinge mechanism and a base frame, wherein each of the driving systems includes a piezo actuator, a connecting block, a lever, a preloading spring, a push rod and a plurality of connecting hinges; the piezo actuator is fixed on the base frame at one end and connected with the connecting block at the other end; the lever is connected between the connecting block and the preloading spring, the connecting block is connected with the lever through one of the connecting hinges; the preloading spring is fixed on the base frame at one end and connected with the lever at the other end, and the lever is connected with the base frame through another one of the connecting hinges; the push rod is respectively connected with the lever and the moving stage through two of the connecting hinges which are disposed at two ends of the push rod; and the moving stage is connected with the base frame by the parallel flexure hinge mechanism.

The parallel flexure hinge mechanism is connected with four corners of the stage, when the stage moves, the parallel hinges deform along shorter directions of the hinges, and transfer forces along longer directions of the hinges, to realize movement guiding and decoupling in X and Y directions for the parallel flexure hinge mechanism.

Each of the parallel hinges includes two mutually perpendicular leaf-spring hinges, which can be designed with other types of hinges, such as a double-notch flexure hinge, a compound leaf-spring hinge and a compound notch hinge.

A notch structure of each of the notch hinges can be in the form of an arc notch, an elliptical notch and a flat-slotted notch.

When the push rod is subjected to a force perpendicular to an axial direction of the push rod, the connecting hinges deform in shorter directions of the connecting hinges, and when the push rod is subjected to a force in the axial direction of the push rod, the connecting hinges transfer forces along longer directions of the connecting hinges, to realize movement decoupling of movement in a non-axial direction for the connecting hinges.

The lever is of an L-shaped structure including a short arm and a long arm, the short arm is connected between the preloading spring and the connecting block, the push rod is connected with the long arm, and the piezo actuator applies an action force to the short arm through the connecting block while the long atm applies an action force to the push rod.

The preloading spring provides a preloading force to the piezo actuator through the lever and the connecting block.

When the piezo actuator is elongated, the action force is transferred to the stage through the connecting block, the lever and the push rod, so as to drive the stage to move in an axial positive direction while the preloading spring compressed; and when the piezo actuator is shortened, the preloading spring provides a restoring force to the lever, so as to drive the stage to move in an axial negative direction.

A direction of the action force of the piezo actuator on the short arm of the lever is perpendicular to that of the action force of the lever on the push rod, and a force arm of the action force of the lever on the push rod is greater than that of the action force of the piezo actuator on the lever, m represents the force arm of the action force of the lever on the push rod, and n represents the force arm of the action force of the piezo actuator on the lever, theoretically, an amplification ratio of the driving systems to a displacement is m/n.

Center lines of two connecting hinges which are disposed at two ends of the push rod is co-linear with a projection of center lines of the moving stage along the axial direction on an X-Y plane, ensuring that the forces of the driving systems are accurately transferred to the moving stage; and center lines of the connecting hinge for connecting the connecting block with the lever is co-linear with a projection of the center line of the piezo actuator on the X-Y plane, ensuring that the force of the piezo actuator is accurately transferred to the short arm of the lever.

The base frame includes a base frame body and a displacement detecting system, wherein the displacement sensor head is fixed on the base frame body, and a gap is remained between the displacement sensor head and the moving stage. A distance between the moving stage and the displacement sensor head changes when the moving stage moves, and a displacement value of the moving stage relative to the base frame is obtained by the displacement detecting system; the base frame further includes installing and positioning hole seats which are connected with the base frame body by another pair of parallel hinges, and the orientation of the hinges is perpendicular to the center line connecting the centers of installing and positioning holes and the center of the moving stage; when the base frame body elastically deforms due to driving force and temperature changes, each pair of parallel hinges may generate an elastic deformation, and the coupling of the plurality pairs of elastically deformed hinges acts on the base frame body; and when the base frame body elastically deforms due to driving force and temperature changes, the elastic deformation of the base frame body itself may be absorbed or released by the coupling action of the plurality pairs of hinges without affecting the positioning accuracy of the moving stage.

The nano positioning stage has an operating principle in the driving system, a displacement of the piezo actuator is converted and amplified by the lever into a displacement of the moving stage.

When the moving stage displaces in the X axis, the piezo actuator in the driving system disposed in the X axis is elongated under an action of a voltage, so as to drive the lever, and apply an action force to the moving stage, so that amplification is realized on the displacement; the moving stage moves in an X direction guided by the parallel flexure hinge mechanism while the preloading spring is compressed: when the piezo actuator is shortened under the action of the voltage, the preloading spring pushes the lever to move in an opposite direction; and meanwhile, when the moving stage moves in the X direction, the gap between the moving stage and the displacement sensor head changes, and a specific displacement value may be measured by the displacement detecting system, the moving stage pulls or pushes the connecting hinges of the driving system disposed in the Y axis to generate deformation in the X direction thereby decoupling the connection with the driving system 2 disposed in the Y axis.

Similarly, when the moving stage displaces in the Y axis, the piezo actuator in the driving system disposed in the Y axis is elongated under an action of a voltage, so as to drive the lever, and apply an action force to the moving stage, so that amplification is realized on the displacement; the moving stage moves in a Y direction guided by the parallel flexure hinge mechanism while the preloading spring is compressed; when the piezo actuator is shortened under the action of the voltage, the preloading spring pushes the lever to move in an opposite direction; and meanwhile, when the moving stage moves in the Y direction, the gap between the moving stage and the displacement sensor head changes, and a specific displacement value may be measured by the displacement detecting system, the moving stage pulls or pushes the connecting hinges of the driving system disposed in the X axis to generate deformation in the Y direction, thereby decoupling the connection with the driving system 2 disposed in the X axis.

Due to a structural design of the push rod and the connecting hinges at two ends thereof, the decoupling of the movements of the moving stage in the X direction and the Y direction may be achieved, and the movement precision is ensured. A structural design of the connecting block and its connecting hinges may prevent the piezo actuator from being subjected to a tangential force during use, thereby ensuring the service life of the piezo actuator.

The disclosure has the following beneficial effects.

The disclosure discloses a two degree-of-freedom nano positioning stage with a parallel flexure hinge mechanism. The moving stages in the X direction and the Y direction are the same stage, and the parallel flexure hinge mechanism and the connecting hinges are used to guide and decouple the movements in the X direction and the Y direction and eliminates the crosstalk between the movements in the X axis and the Y axis, and the driving systems are integrally designed and processed, greatly reducing the volume of the nano positioning stage. The two degree-of-freedom nano positioning stage with a parallel flexure hinge mechanism provides a large displacement by an amplification principle of the lever and the hinges, has characteristics of simple and compact structure, strong integrity, good consistency in static and dynamic characteristics of each axis, small volume, convenient installation and maintenance, and low cost, and may be used in a place with small space, large stroke; and because a multi-hinge coupling flexible connecting manner is used to install and fix a stage body, positioning errors caused by the deformation of the stage body due to driving force and temperature changes are eliminated, so that the purpose of further improving the connecting and positioning accuracy is achieved.

DESCRIPTION OF THE DRAWINGS

In order to make the technical solutions in the disclosure or in the prior art described more clearly, the drawings associated to the description of the embodiments or the prior art will be illustrated concisely hereinafter. Obviously, the drawings described below are only some embodiments according to the disclosure. Numerous drawings therein will be apparent to one of ordinary skill in the art based on the drawings described in the disclosure without creative efforts.

DETAILED DESCRIPTION OF PREFERRED EMBODIMENTS

The disclosure will be further described in conjunction with accompanying drawings and specific embodiments, in order to provide a better understanding of the claimed technical ideal of the disclosure.

It should be noted that terms "first", "second" and the like in the specification and claims as well as accompanying drawings of the disclosure are used to distinguish similar objects instead of describing a specific sequence or precedence order, and do not exclude that these terms may be interchanged where appropriate, so that the embodiments described herein can be implemented in a sequence other than what is illustrated or described here. Furthermore, terms "comprise", "comprising", "includes" and "including" or other variations are intended to encompass a non-exclusive inclusion, such that a process, method, article, or apparatus that includes a sequence of elements not only includes these elements, but also includes other elements that not specifically listed.

With reference to FIG. 1 to FIG. 7, a two degree-of freedom nano positioning stage with a parallel flexure hinge mechanism includes a driving system 1 disposed in an X axis, a driving system 2 disposed in a Y axis, a moving stage 3, a parallel flexure hinge mechanism 4 and a base frame 5. The moving stage 3 is connected with the base frame 5 through a parallel flexure hinge mechanism 4.

Figure 2:
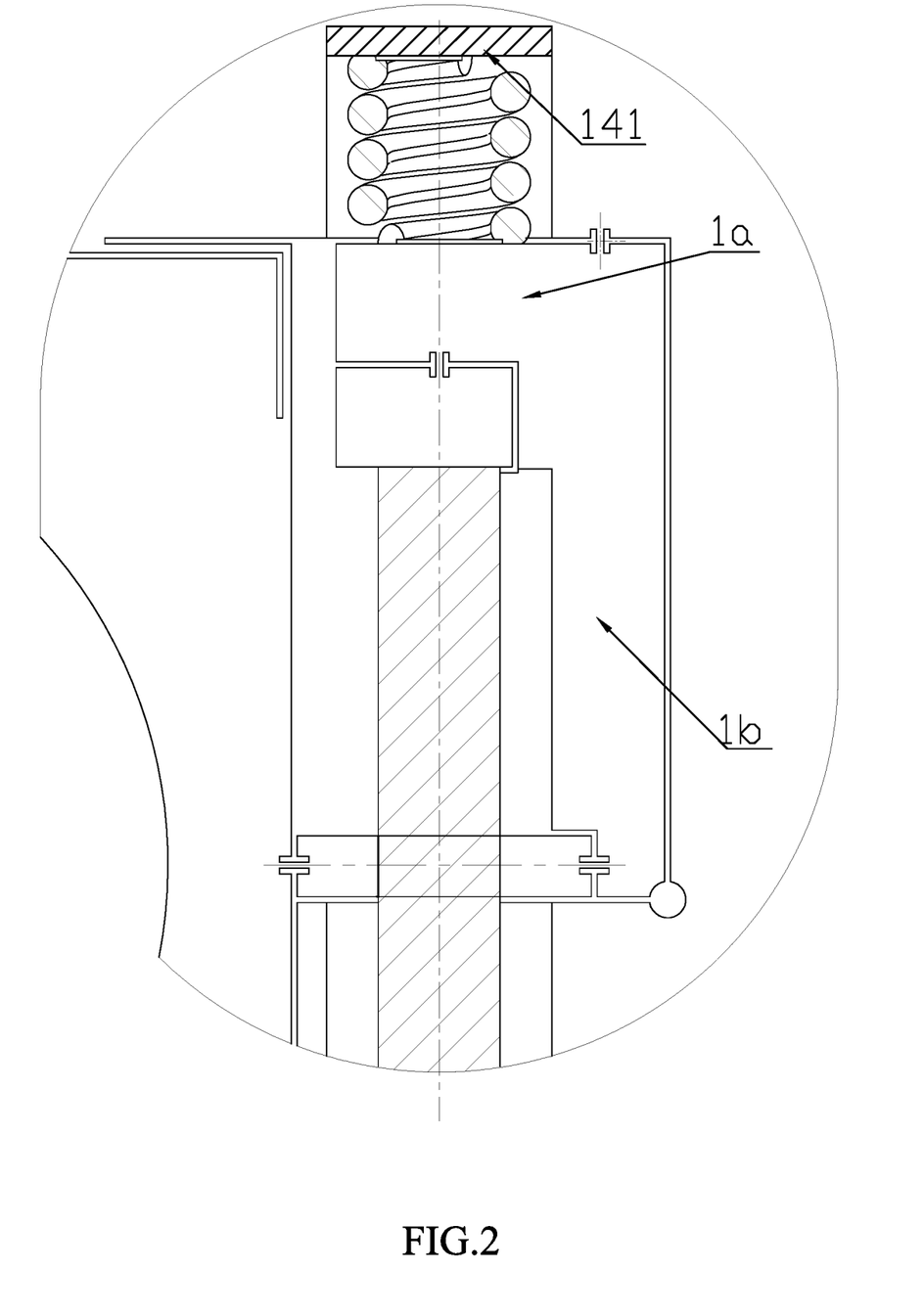
FIG. 2 is a partial enlarged diagram showing a driving system disposed in an X axis of a two degree-of freedom nano positioning stage with a parallel flexure hinge mechanism according to the disclosure.

The driving system 1 disposed in the X axis includes a piezo actuator 11, a connecting block 12, a lever 13, a preloading spring 14, a push rod 15, and connecting hinges 16a, 16b, 16c and 16d. The piezo actuator 11 is fixed on the base frame 5 at one end and connected with the connecting block 12 at the other end. The lever 13 is connected between the connecting block 12 and the preloading spring 14, the connecting block 12 is connected with the lever 13 through the connecting hinge 16c, the preloading spring 14 is fixed on the base frame 5 at one end, and connected with the lever 13 at the other end, the lever 13 is connected with the base frame 5 through the connecting hinge 16d, and the push rod 15 is connected with the lever 13 and the stage 3 through the two connecting hinges 16a and 16b, which are disposed at two ends of the push rod respectively.

Figure 3:
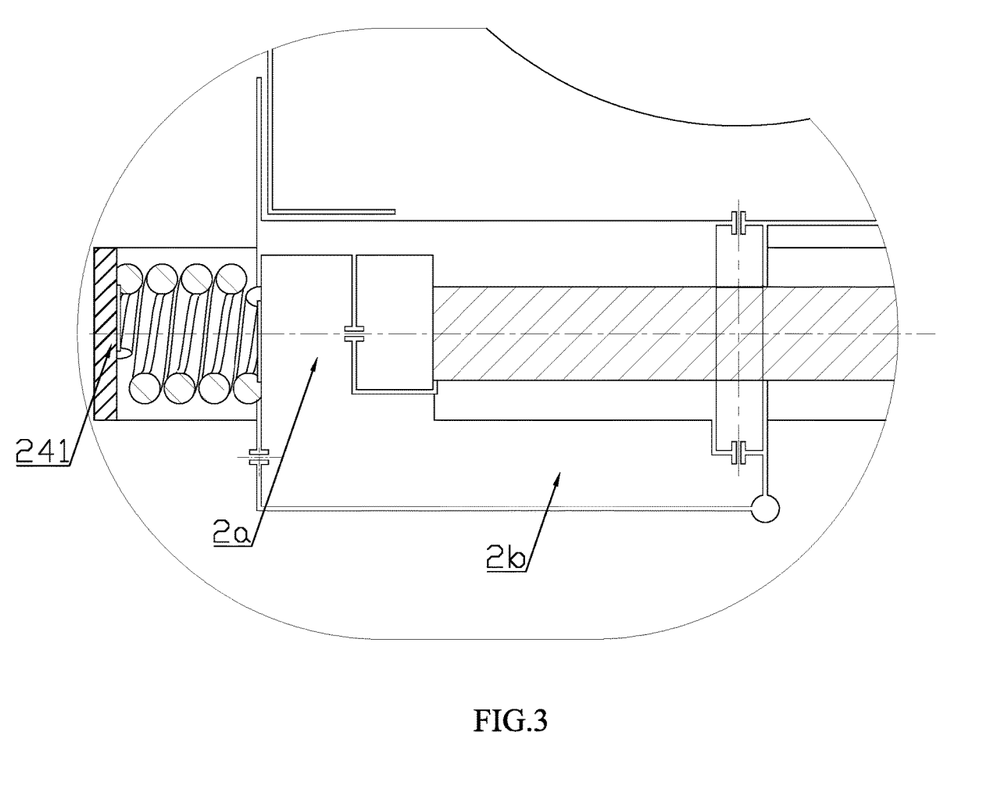
FIG. 3 is a partial enlarged diagram showing a driving system disposed in a Y axis of a two degree-of freedom nano positioning stage with a parallel flexure hinge mechanism according to the disclosure.

The driving system 2 disposed in the Y axis includes a piezo actuator 21, a connecting block 22, a lever 23, a preloading spring 24, a push rod 25, and connecting hinges 26a, 26b, 26c and 26d. The piezo actuator 21 is fixed on the base frame 5 at one end and connected with the connecting block 22 at the other end. The lever 23 is connected between the connecting block 22 and the preloading spring 24, the connecting block 22 is connected with the lever 23 through the connecting hinge 26c, the preloading spring 24 is fixed on the base frame 5 at one end, and connected with the lever 23 at the other end, the lever 23 is connected with the base frame 5 through the connecting hinge 26d, and the push rod 25 is connected with the lever 23 and the stage 3 through the two connecting hinges 26a and 26b, which are disposed at two ends of the push rod respectively.

The parallel flexure hinge mechanism 4 are connected with four corners of the moving stage 3, and when the moving stage 3 moves, the hinges of the parallel flexure hinge mechanism 4 deform along shorter directions of the hinges, and transfer forces along longer directions of the hinges, to realize movement guiding and decoupling in an X direction and a Y direction for, the parallel flexure hinges mechanism 4. When the push rod 15/25 is subjected to a force perpendicular to an axial direction of the push rod 15/25, the connecting hinges deform in shorter directions of the connecting hinges and when the push rod 15/25 is subjected to a force in the axial direction of the push rod 15/25, the connecting hinges transfer forces along longer directions of the connecting hinges, to realize movement decoupling of movement in a non-axial direction for the connecting hinge 16/26. The lever 13/23 is of an L-shaped structure, the preloading spring 14/24 and the connecting block 12/22 are connected with a short arm 1a/2a, and the push rod 15/25 is connected with a long arm 1b/2b, the piezo actuator 11/21 applies an action force to the short arm 1a/2a through the connecting block 12/22 while the long arm 1b/2b applies an action force to the push rod 15/25.

The preloading spring 4/24 is preloaded by a tightening nut 141/241 while providing a preloading force to the piezo actuator through the lever and the connecting block.

When the piezo actuator 11/21 is elongated, the action force is transferred to the moving stage 3 through the connecting block 12/22, the lever 13/23 and the push rod 15/25, and the moving stage 3 is driven to move in an axial positive direction while the preloading spring 14/24 is compressed; and when the piezo actuator 11/21 is shortened, the preloading spring 14/24 provides a restoring force to the lever 13/23 to drive the moving stage 3 to move in an axial negative direction.

Figure 7:
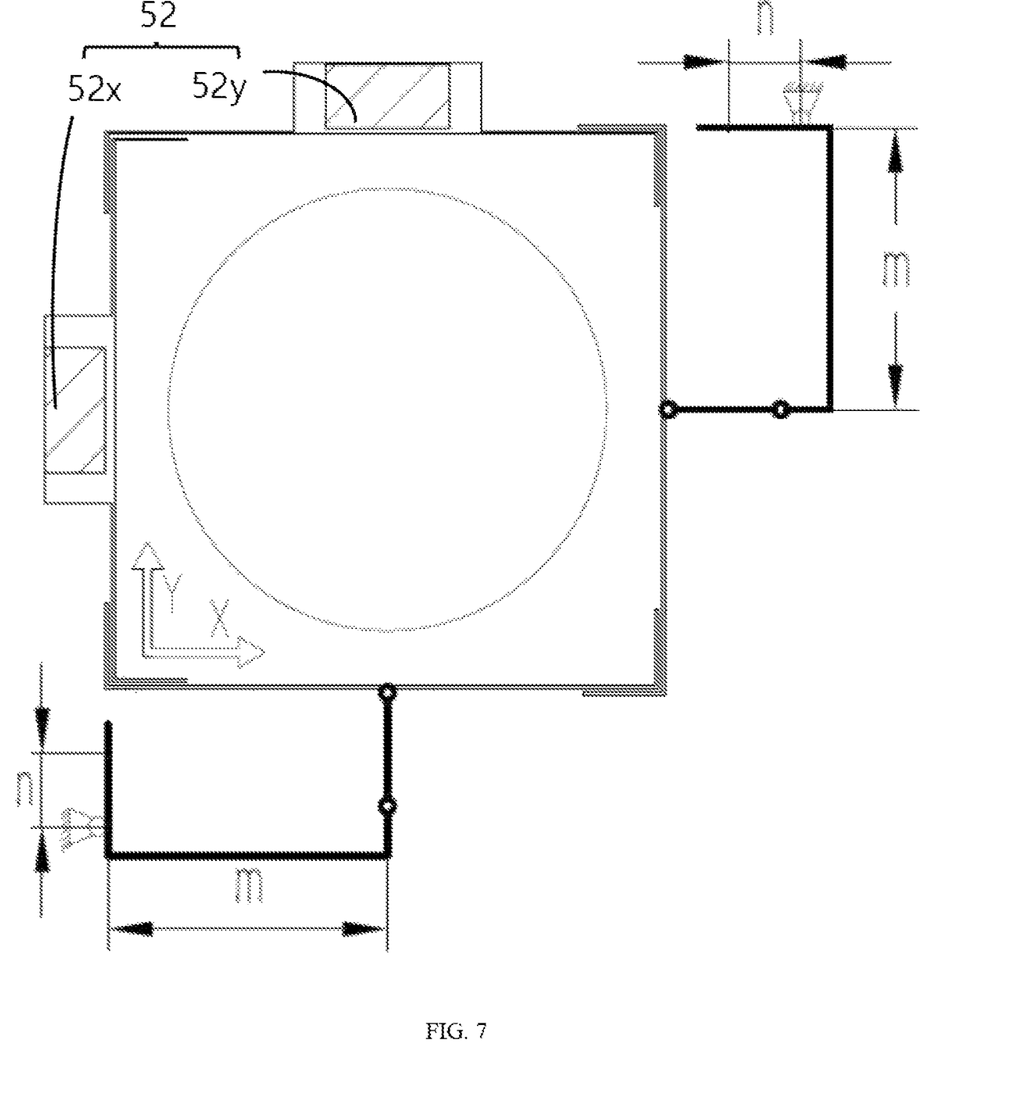
FIG. 7 is a force analysis diagram of driving systems of a two degree-of freedom nano positioning stage with a parallel flexure hinge mechanism according to the disclosure.

A direction of the action force of the piezo actuator 11/21 on the short arm 1a/2a of the lever is perpendicular to that of the action force of the lever 13/23 on the push rod 15/25, and a force arm of the action force of the lever 13/23 on the push rod 15/25 is greater than that of the action force of the piezo actuator 11/21 on the lever 13/23, m represents the force arm of the action force of the lever 13/23 on the push rod 15/25, n represents the force arm of the action force of the piezo actuator 11/21 on the lever 13/23, and theoretically, an amplification ratio of the driving systems 1/2 to a displacement is m/n.

Center lines of two connecting hinges 16a and 16b (or 26a and 26b), which are disposed at two ends of the push rod 15/25, of the connecting hinges is co-linear with a projection of a center line of the moving stage along the axial direction on an X-Y plane, ensuring that the force of the driving system is accurately transferred to the moving stage; a center line of the connecting hinge 16c/26c for connecting the connecting block 12/22 with the lever 13/23 is co-linear with a projection of the center line of the piezo actuator on the X-Y plane, ensuring that the force of the piezo actuator 11/21 is accurately transferred to the short arm 1a/2a of the lever 13/23.

Figure 1:
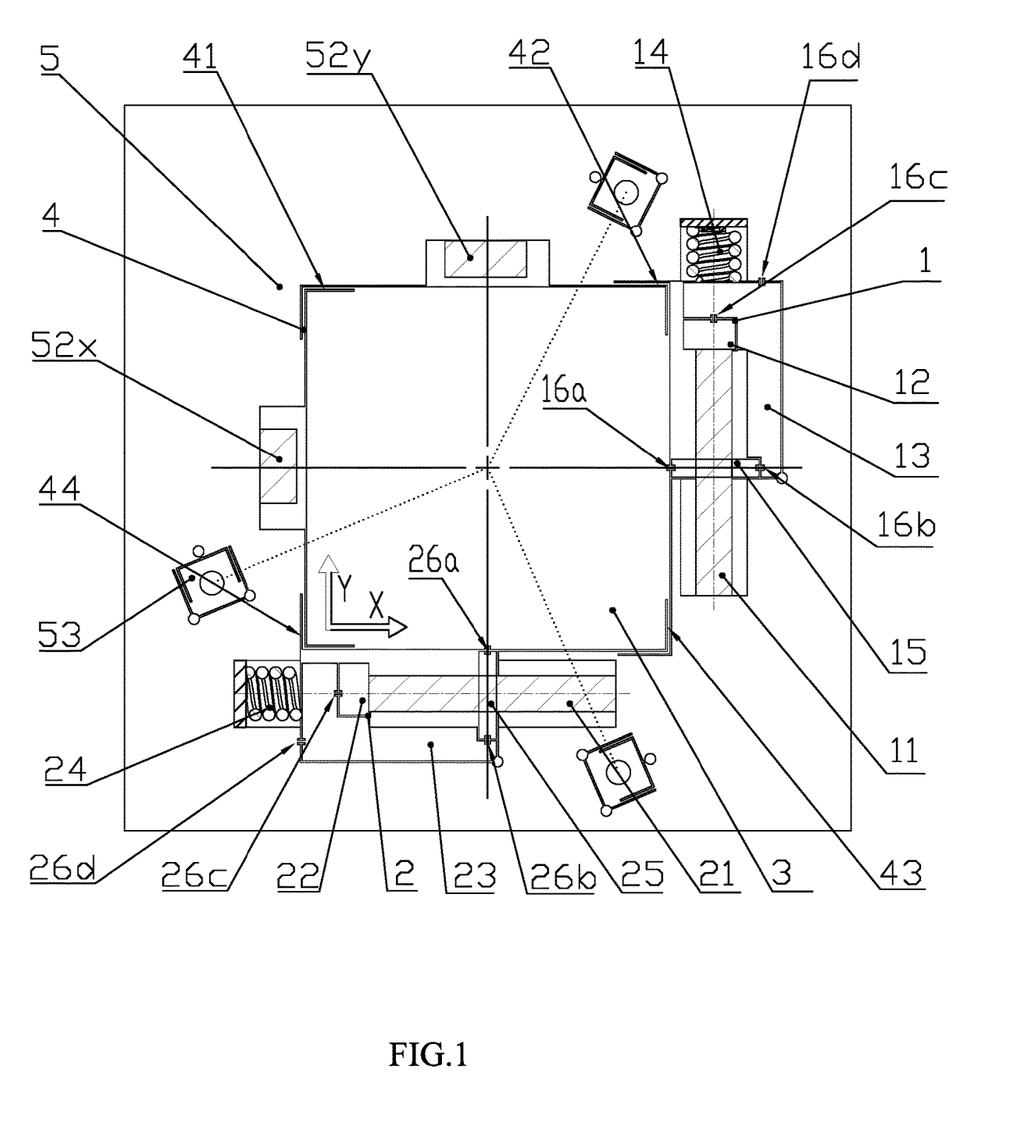
FIG. 1 is a schematic diagram showing an overall structure of a two degree-of-freedom nano positioning stage with a parallel flexure hinge mechanism according to the disclosure.
Figure 6:
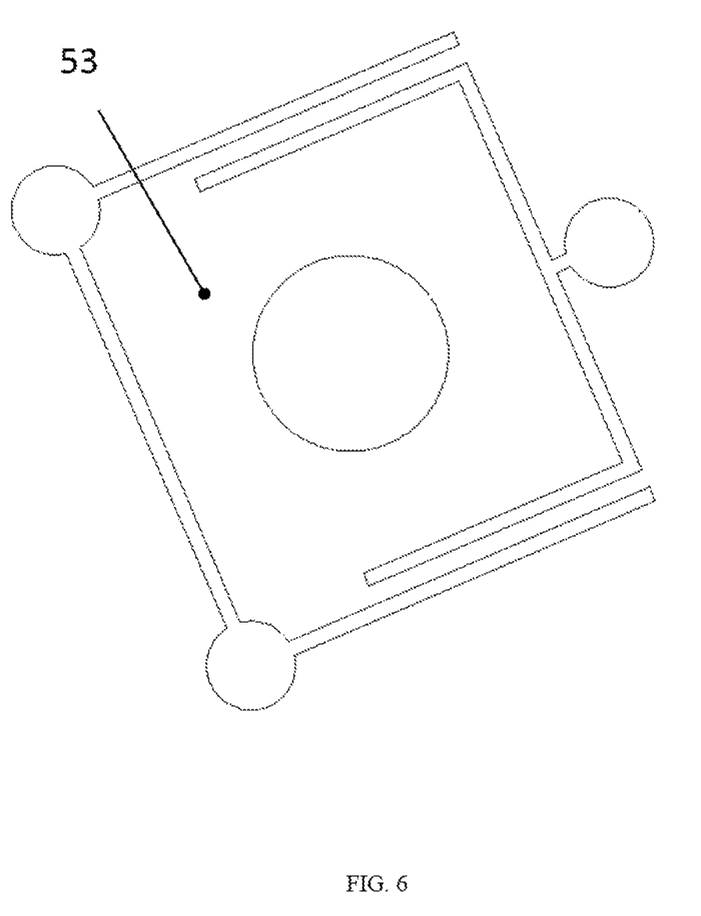
FIG. 6 is a schematic structural diagram of an installing and positioning hole seat of a two degree-of freedom nano positioning stage with a parallel flexure hinge mechanism according to the disclosure.

The base frame 5 includes a base frame body 51 and a displacement detecting system 52, wherein the sensor head of the displacement detecting system 52 is fixed on the base frame body 51, and a gap is remained between the sensor head and the moving stage 3. A distance between the moving stage 3 and the sensor head changes when the moving stage 3 moves, and a displacement value of the moving stage 3 is a obtained by the displacement detecting system 52; the base frame 5 further includes installing and positioning hole seats 53 which are connected with the base frame body 51 by another parallel hinges, and the center lines perpendicular to the parallel hinges and through the centers of installing and positioning holes pass through the center of the moving stage; each pair of hinges may generate an elastic deformation, and the coupling of the plurality pairs of elastically deformed hinges acts on the base frame body 51; and when the base frame body 51 elastically deforms due to driving force and temperature changes, the elastic deformation of the base frame body 51 itself may be absorbed or released by a coupling action of the plurality of hinges.

Figure 4:
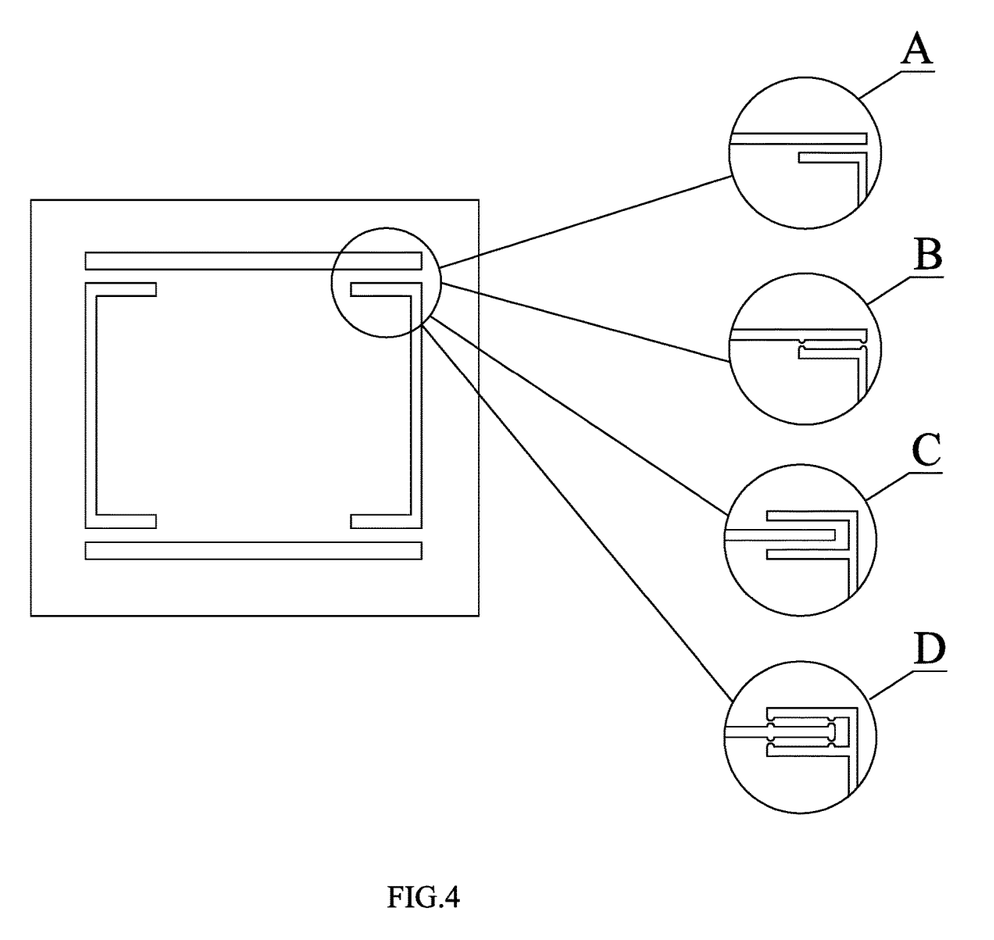
FIG. 4 is a schematic structural diagram of parallel hinges of a two of degree-of freedom nano positioning stage with a parallel flexure hinge mechanism according to the disclosure.

Preferably, the number of the parallel flexure hinges 4 is 4.

Preferably, each of the flexure hinges of the parallel flexure hinge mechanism 4 includes two mutually perpendicular leaf spring hinges A.

Preferably, each of the leaf spring hinges A could be designed with other types of hinge structures, such as a single-notch hinge B, a compound leaf spring hinge C and a compound-notch hinge D.

Figure 5:
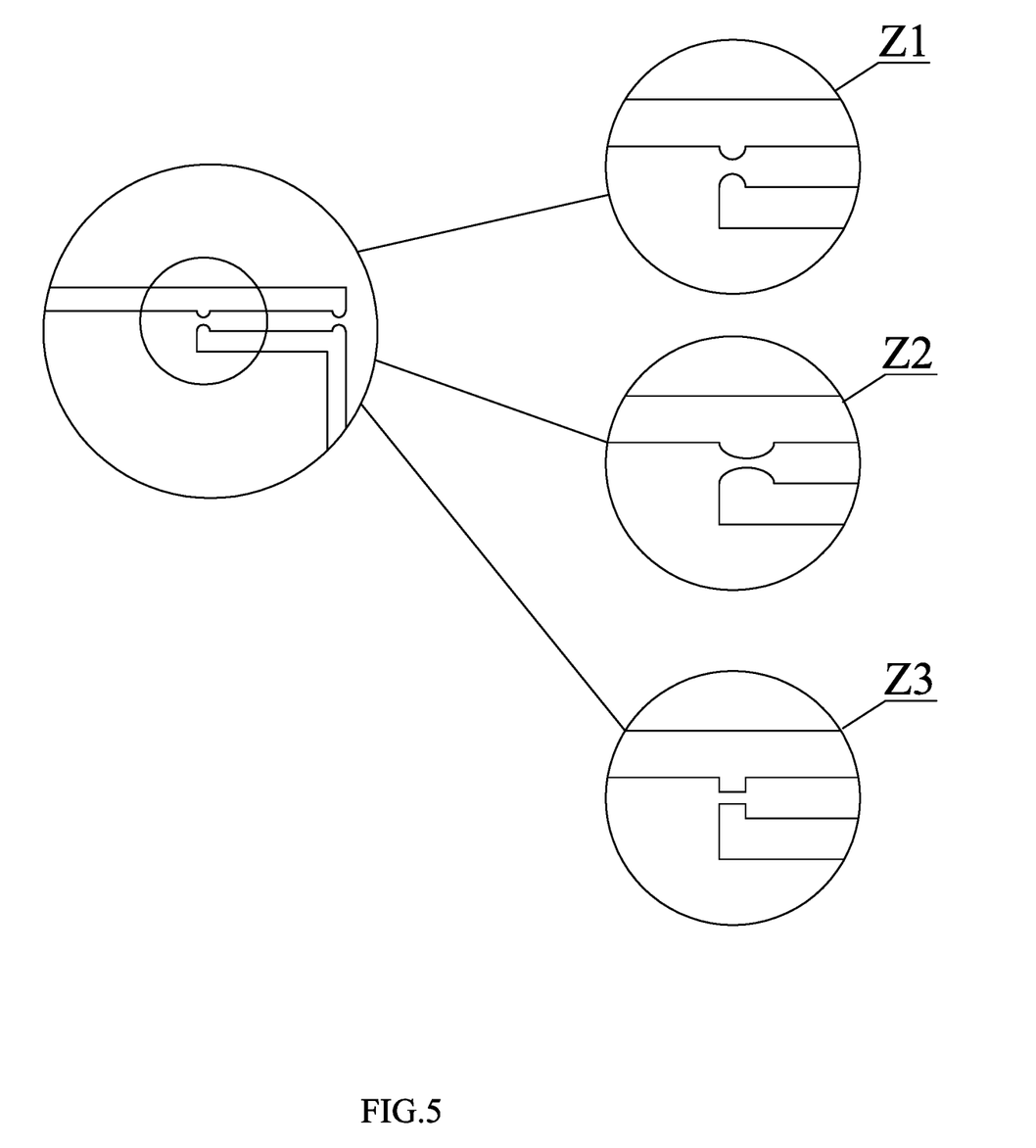
FIG. 5 is a schematic diagram showing a notch structure of notch hinges of a two degree-of freedom nano positioning stage with a parallel flexure hinge mechanism according to the disclosure.

Preferably, a notch structure of each of the notch hinges includes an arc notch Z1, an elliptical notch Z2 and a flat-slotted notch Z3.

Preferably, the displacement detecting system 52 includes an X-axis displacement detecting system 52x and a Y-axis displacement detecting system 52y.

Preferably, the number of the installing and positioning hole seats 53 is 3. It could be more than 3.

The nano positioning stage has an operating principle that in the driving system 1/2, a displacement of the piezo actuator 11/21 is converted and amplified by the lever 13/23 into a displacement of the moving stage 3.

When the moving stage 3 displaces in the X axis, the piezo actuator 11 in the driving system 1 disposed in the X axis is elongated under an action of a voltage, so as to drive the lever 13, and apply an action force to the moving stage 3, so that amplification is realized on the displacement; the moving stage 3 moves in an X direction guided by the parallel flexure hinge mechanism 4 while the preloading spring 14 is compressed; when the piezo actuator 11 is shortened under the action of the voltage, the preloading spring 14 pushes the lever 13 to move in an opposite direction; and meanwhile, when the moving stage 3 moves in the X direction, the gap between the moving stage 3 and the X-axis displacement sensor head changes, and a specific displacement value may be measured by the X-axis displacement detecting system 52x, when the moving stage 3 moves in the X direction, the moving stage 3 drives the push rod 25 of the driving system 2 disposed in the Y axis and two connecting hinges 26a and 26b, which are disposed at two ends of the push rod 25, of the connecting hinges to generate a displacement in the X direction, thereby decoupling the connection with the driving system 2 disposed in the Y axis.

Similarly, When the moving stage 3 displaces in the Y axis, the piezo actuator 21 in the driving system 2 disposed in the Y axis is elongated under an action of a voltage, so as to drive the lever, and apply an action force to the moving stage 3, so that amplification is realized on the displacement; the moving stage 3 moves in a Y direction guided by the parallel flexure hinge mechanism 4 while the preloading spring 24 is compressed; when the piezo actuator 21 is shortened under the action of the voltage, the preloading spring 24 pushes the lever 23 to move in an opposite direction; and meanwhile, when the moving stage 3 moves in the Y direction, the gap between the moving stage 3 and the Y-axis displacement sensor head changes, and a specific displacement value may be measured by the Y-axis displacement detecting system 52y, when the moving stage 3 moves in the Y direction, the moving stage 3 drives the push rod 15 of the driving system 1 disposed in the X axis and two connecting hinges 16a and 16b, which are disposed at two ends of the push rod 15, of the connecting hinges to generate a displacement in the Y direction, thereby decoupling the connection with the driving system 2 disposed in the X axis.

A structural design of the push rod 15/25 and the connecting hinges at two ends thereof may achieve the movement decoupling of the moving stage 3 in the X direction and the Y direction, thereby ensuring the movement precision. A structural design of the connecting block 12/22 and the connecting hinges 16c/26c may prevent the piezo actuator 11/21 from being subjected to a tangential force during use, thereby ensuring the service life of the piezo actuator 11/21.

While the embodiments of the disclosure have been shown and described, it will be understood by those skilled in the art that various changes, modifications, substitutions and variations may be made to these embodiments without departing from the principle and spirit of the disclosure, and the scope of the disclosure is defined by the appended claims and their equivalents.

We claim:

1. A nano positioning stage comprising two driving systems respectively arranged along an X axis and a Y axis, a moving stage, a parallel flexure hinge mechanism and a base frame;

wherein each of the driving systems comprises a piezo actuator, a connecting block, a lever, a preloading spring, a push rod and a plurality of connecting hinges; the piezo actuator is fixed on the base frame at one end and connected with the connecting block at the other end; the lever is connected between the connecting block and the preloading spring; the connecting block is connected with the lever through one of the connecting hinges; the preloading spring is fixed on the base frame at one end and connected with the lever at the other end, and the lever is connected with the base frame through another one of the connecting hinges; the push rod is respectively connected with the lever and the moving stage through two of the connecting hinges which are disposed at two ends of the push rod;

the moving stage is connected with the base frame by the parallel flexure hinge mechanism;

when the piezo actuator is elongated, an action force is transferred to the moving stage through the connecting block, the lever and the push rod, so as to drive the moving stage to move in an axial positive direction while the preloading spring is compressed; and when the piezo actuator is shortened, the preloading spring provides a restoring force to the lever, so as to drive the moving stage to move in an axial negative direction.

2. The nano positioning stage according to claim 1, wherein the parallel flexure hinge mechanism is connected with four corners of the moving stage, when the moving stage moves, the hinges of the parallel flexure hinge mechanism deform along shorter directions of the hinges, to realize movement guiding and decoupling in X and Y directions for the parallel flexure hinge mechanism.

3. The nano positioning stage according to claim 1, wherein when the push rod is subjected to a force perpendicular to an axial direction of the push rod, the connecting hinges deform in shorter directions of the connecting hinges, and when the push rod is subjected to a force in the axial direction of the push rod, the connecting hinges transfer forces along longer directions of the connecting hinges, to realize movement decoupling of movement in a non-axial direction for the connecting hinges.

4. The nano positioning stage according to claim 1, wherein the lever is of an L-shaped structure comprising a short arm and a long arm, the short arm is connected between the preloading spring and the connecting block, the push rod is connected with the long arm, and the piezo actuator applies an action force to the short arm by the connecting block while the long arm applies an action force to the push rod.

5. The nano positioning stage according to claim 4, wherein a direction of the action force of the piezo actuator on the short arm of the lever is perpendicular to that of the action force of the lever on the push rod, and a force arm of the action force of the lever on the push rod is greater than that of the action force of the piezo actuator on the lever.

6. The nano positioning stage according to claim 1, wherein the preloading spring is pretensioned by a tightening nut while providing a preloading force to the piezo actuator through the lever and the connecting block.

7. The nano positioning stage according to claim 1, wherein center lines of two connecting hinges which are disposed at two ends of the push rod are co-linear with a projection of a center line of the moving stage along an axial direction on an X-Y plane; and a center line of the connecting hinge for connecting the connecting block with the lever is co-linear with a projection of a center line of the piezo actuator on the X-Y plane.

8. The nano positioning stage according to claim 1, wherein the base frame comprises a base frame body and a displacement detecting system, a displacement sensor head of the displacement detecting system is fixed on the base frame body, and a gap is remained between the displacement sensor head and the moving stage; and a distance between the moving stage and the displacement sensor head changes when the moving stage moves, and a displacement value of the moving stage is obtained by the displacement detecting system.

9. The nano positioning stage according to claim 1, wherein the base frame comprises a base frame body and installing and positioning hole seats, the installing and positioning hole seats are connected with the base frame body by another pair of parallel hinges, the orientation of the hinges is perpendicular to the center line connecting the centers of installing and positioning holes and the center of the moving stage.

* * * * *